(12) United States Patent
Corfield et al.

(10) Patent No.: US 8,831,940 B2
(45) Date of Patent: Sep. 9, 2014

(54) HIERARCHICAL QUICK NOTE TO ALLOW DICTATED CODE PHRASES TO BE TRANSCRIBED TO STANDARD CLAUSES

(75) Inventors: Charles Corfield, Boulder, CO (US); Brian Marquette, Longmont, CO (US); David Mondragon, Lakewood, CO (US); Rebecca Heins, Boulder, CO (US)

(73) Assignee: NVOQ Incorporated, Boulder, CO (US)

( * ) Notice: Subject to any disclaimer, the term of this patent is extended or adjusted under 35 U.S.C. 154(b) by 416 days.

(21) Appl. No.: 13/052,900

(22) Filed: Mar. 21, 2011

(65) Prior Publication Data

US 2011/0246195 A1 Oct. 6, 2011

Related U.S. Application Data

(60) Provisional application No. 61/319,116, filed on Mar. 30, 2010.

(51) Int. Cl.
*G10L 15/26* (2006.01)
*G10L 15/18* (2013.01)

(52) U.S. Cl.
CPC .................... *G10L 15/265* (2013.01); *G10L 15/1815* (2013.01)
USPC .............. 704/235; 704/9; 704/10; 704/270; 704/278; 704/254; 704/243; 455/466; 382/173; 379/52; 715/205; 715/209

(58) Field of Classification Search
CPC . G10L 15/265; G10L 15/22; H04M 2201/40; H04M 2201/60; G06F 17/30746
USPC ........................................................ 704/235
See application file for complete search history.

(56) References Cited

U.S. PATENT DOCUMENTS

| | | | | |
|---|---|---|---|---|
| 5,781,891 | A * | 7/1998 | Dvorak et al. | 705/2 |
| 6,026,395 | A * | 2/2000 | Bennett et al. | 1/1 |
| 6,138,087 | A * | 10/2000 | Budzinski | 704/9 |
| 6,366,909 | B1 * | 4/2002 | Yuasa et al. | 1/1 |
| 6,374,214 | B1 | 4/2002 | Friedland et al. | |
| 6,453,294 | B1 * | 9/2002 | Dutta et al. | 704/270.1 |
| 6,801,190 | B1 * | 10/2004 | Robinson et al. | 345/173 |
| 6,810,146 | B2 * | 10/2004 | Loui et al. | 382/173 |
| 6,816,578 | B1 * | 11/2004 | Kredo et al. | 379/88.17 |
| 7,200,556 | B2 * | 4/2007 | Aktas et al. | 704/235 |
| 7,369,988 | B1 * | 5/2008 | Thenthiruperai et al. | 704/10 |
| 7,376,434 | B2 * | 5/2008 | Thomas et al. | 455/466 |
| 7,383,171 | B2 * | 6/2008 | Dymetman et al. | 704/9 |
| 7,613,610 | B1 * | 11/2009 | Zimmerman et al. | 704/235 |

(Continued)

OTHER PUBLICATIONS

International Search Report and Written Opinion dated Oct. 25, 2011 for Int. Appl. No. PCT/US2011/029237, 8 pp.

*Primary Examiner* — Pierre-Louis Desir
*Assistant Examiner* — Fariba Sirjani
(74) *Attorney, Agent, or Firm* — Perkins Coie LLP

(57) ABSTRACT

A dictation system that allows using trainable code phrases is provided. The dictation system operates by receiving audio and recognizing the audio as text. The text/audio may contain code phrases that are identified by a comparator that matches the text/audio and replaces the code phrase with a standard clause that is associated with the code phrase. The database or memory containing the code phrases is loaded with matched standard clauses that may be identified to provide a hierarchal system such that certain code phrases may have multiple meanings depending on the user.

13 Claims, 3 Drawing Sheets

(56) References Cited

U.S. PATENT DOCUMENTS

| | | | |
|---|---|---|---|
| 7,693,267 B2* | 4/2010 | Howell et al. | 379/88.14 |
| 7,865,356 B2* | 1/2011 | Weng et al. | 704/9 |
| 7,925,498 B1* | 4/2011 | Baker et al. | 704/9 |
| 7,925,506 B2* | 4/2011 | Farmaner et al. | 704/257 |
| 8,019,604 B2* | 9/2011 | Ma | 704/254 |
| 8,032,372 B1* | 10/2011 | Zimmerman et al. | 704/235 |
| 8,108,214 B2* | 1/2012 | Weng et al. | 704/251 |
| 8,249,876 B1* | 8/2012 | Ainslie | 704/270 |
| 8,286,071 B1* | 10/2012 | Zimmerman et al. | 715/205 |
| 8,340,966 B2* | 12/2012 | Kerimovska et al. | 704/260 |
| 2003/0008633 A1 | 1/2003 | Bartosik | |
| 2003/0083885 A1 | 5/2003 | Frimpong-Ansah | |
| 2004/0019482 A1 | 1/2004 | Holub | |
| 2004/0193049 A1* | 9/2004 | Greenberg | 600/437 |
| 2004/0243551 A1* | 12/2004 | Boone et al. | 707/3 |
| 2004/0267527 A1* | 12/2004 | Creamer et al. | 704/235 |
| 2005/0114129 A1* | 5/2005 | Watson et al. | 704/235 |
| 2006/0149558 A1* | 7/2006 | Kahn et al. | 704/278 |
| 2006/0241943 A1* | 10/2006 | Benja-Athon et al. | 704/235 |
| 2006/0293890 A1* | 12/2006 | Blair et al. | 704/235 |
| 2007/0011608 A1* | 1/2007 | Titemore et al. | 715/531 |
| 2007/0061364 A1* | 3/2007 | Klein, Jr. | 707/104.1 |
| 2007/0076862 A1* | 4/2007 | Chatterjee et al. | 379/433.06 |
| 2007/0239445 A1* | 10/2007 | Kobal et al. | 704/235 |
| 2008/0243500 A1* | 10/2008 | Bisani et al. | 704/235 |
| 2009/0006345 A1* | 1/2009 | Platt et al. | 707/4 |
| 2009/0018830 A1* | 1/2009 | Emmanuel | 704/235 |
| 2009/0150148 A1* | 6/2009 | Abe | 704/243 |
| 2009/0228273 A1* | 9/2009 | Wang et al. | 704/235 |
| 2009/0248401 A1* | 10/2009 | Grabarnik et al. | 704/10 |
| 2009/0324025 A1* | 12/2009 | Camp et al. | 382/124 |
| 2010/0027765 A1* | 2/2010 | Schultz et al. | 379/52 |
| 2010/0036676 A1* | 2/2010 | Safdi et al. | 705/2 |
| 2010/0070275 A1* | 3/2010 | Cast | 704/235 |
| 2010/0151889 A1* | 6/2010 | Chen et al. | 455/466 |
| 2011/0317828 A1* | 12/2011 | Corfield | 379/265.02 |
| 2012/0166193 A1* | 6/2012 | Kobal et al. | 704/235 |
| 2012/0239429 A1* | 9/2012 | Corfield | 705/3 |
| 2013/0117022 A1* | 5/2013 | Chen et al. | 704/235 |

\* cited by examiner

400

HIERARCHICAL QUICK NOTE TO ALLOW DICTATED CODE PHRASES TO BE TRANSCRIBED TO STANDARD CLAUSES

CLAIM OF PRIORITY UNDER 35 U.S.C. §§119 AND 120

The present application claims priority to U.S. Provisional Patent Application Ser. No. 61/319,166 filed Mar. 30, 2010, titled HIERARCHICAL QUICK NOTE TO ALLOW DICTATED CODE PHRASES TO BE TRANSCRIBED TO STANDARD CLAUSES, which is incorporated herein as if set out in full.

REFERENCE TO CO-PENDING APPLICATIONS FOR PATENT

None.

BACKGROUND

1. Field

The technology of the present application relates generally to dictation systems, and more particular, to a hierarchical quick note that allows the use of a short dictated code phrase to be transcribed to a standard clause.

2. Background

Originally, dictation was an exercise where one person spoke while another person transcribed what was spoken. Shorthand was developed to facilitate transcription by allowing the transcriptionist to write symbols representative of certain utterances. Subsequently, the transcriptionist would replace the shorthand symbol with the actual utterance.

With modern technology, dictation has advanced to the stage where voice recognition and speech-to-text technologies allow computers and processors to serve as the transcriber. Speech recognition engines receive the utterances and provide a transcription of the same, which may subsequently be updated, altered, or edited by the speaker.

Current technology has resulted in essentially two styles of computer based dictation and transcription. One style involves loading software on a machine to receive and transcribe the dictation, which is generally known as client side dictation. The machine transcribes the dictation in real-time or near real-time. The other style involves sending the dictation audio to a centralized server, which is generally known as server side dictation. The centralized server transcribes the audio file and returns the transcription. There are two modes of server side dictation: (a) "batch" when the transcription is accomplished after hours, or the like, when the server has less processing demands; or (b) "real-time" when the server returns the transcription as a stream of textual data.

As can be appreciated, the present computer based dictation and transcription systems have drawbacks. One drawback is the lack of a shorthand type of methodology. Currently, dictation systems transcribe what is spoken. Certain industries, however, have repetitive clauses and phrases that must be repeated frequently. Conventional speech recognition software, however, is not typically customized for a particular industry so the repetitive clauses and phrases must be fully enunciated so the speech recognition software can accurately transcribe the repetitive clauses and phrases. As can be appreciated, repeating common clauses and phrases is time consuming. Against this background, it would be desirous to provide a method and apparatus wherein the repetitive clauses and phrases may be incorporated into a customizable shorthand or hierarchical quick note.

SUMMARY

To attain the advantages and in accordance with the purpose of the technology of the present application, a trainable transcription module having a speech recognition engine is provided. The trainable transcription module receives code phrases or quick notes from one of a plurality of sources. The code phrases or quick notes are matched with particular transcription textual data. The speech recognition engine receives audio data and converts the audio data to converted textual data. A comparator in the trainable transcription module would compare the converted textual data to the code phrases or quick notes from one of the plurality of sources. If the textual data matches one of the code phrases or quick notes, the trainable transcription module replaces the recognized textual data with the equated particular transcription textual data in the transcription of the audio. The comparator may use patterns, such as regular expressions, to match the converted textual data, and the 'particular transcription textual data' may include parametric substitution of values specified (as parameters) in the converted textual data.

Methods for using code phrases and quick notes from one of a plurality of sources also are provided. The method includes loading code phrases or quick notes into a trainable transcription module. The code phrases or quick notes would be equated with particular transcription textual data. Audio would be received and converted to converted textual data. The converted textual data would be compared to the code phrases or quick notes. If it is determined that the converted textual data matches the code phrase or quick note, the converted textual data would be removed, replaced, or overwritten with particular transcription textual data. The replacement includes also parametric substitution.

In certain aspects of the technology of the present invention, the converted textual data would only be compared to the code phrases or quick notes when the converted textual data or parametric substitution has at least a certain confidence. The confidence may be configurable depending on the application, but may require, for example, a confidence of 90% or more.

In still other aspects of the technology, code phrases or quick notes may be established in hierarchical arrangement, such as, for example, headquarters, division, corporate, or individual. Other organization structures are contemplated. In one aspect, a code phrase (1) may be established that is non-modifiable by entities lower in the hierarchical arrangement. In another aspect, the code phrase (1) may be established that is non-modifiable by entities higher in the hierarchical arrangement. In still another aspect, the code phrase (1) may be modified by any entity in the hierarchical arrangement.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION

The technology of the present application will now be explained with reference to FIGS. 1-4. While the technology of the present application is described with relation to a transcription module resident with a speech recognition engine, one of ordinary skill in the art will recognize on reading the disclosure that other configurations are possible. For example, the technology of the present application may be used in conjunction with a thin or fat client such that the modules, engines, memories, and the like are connected locally or remotely. Moreover, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated.

Figure 1:
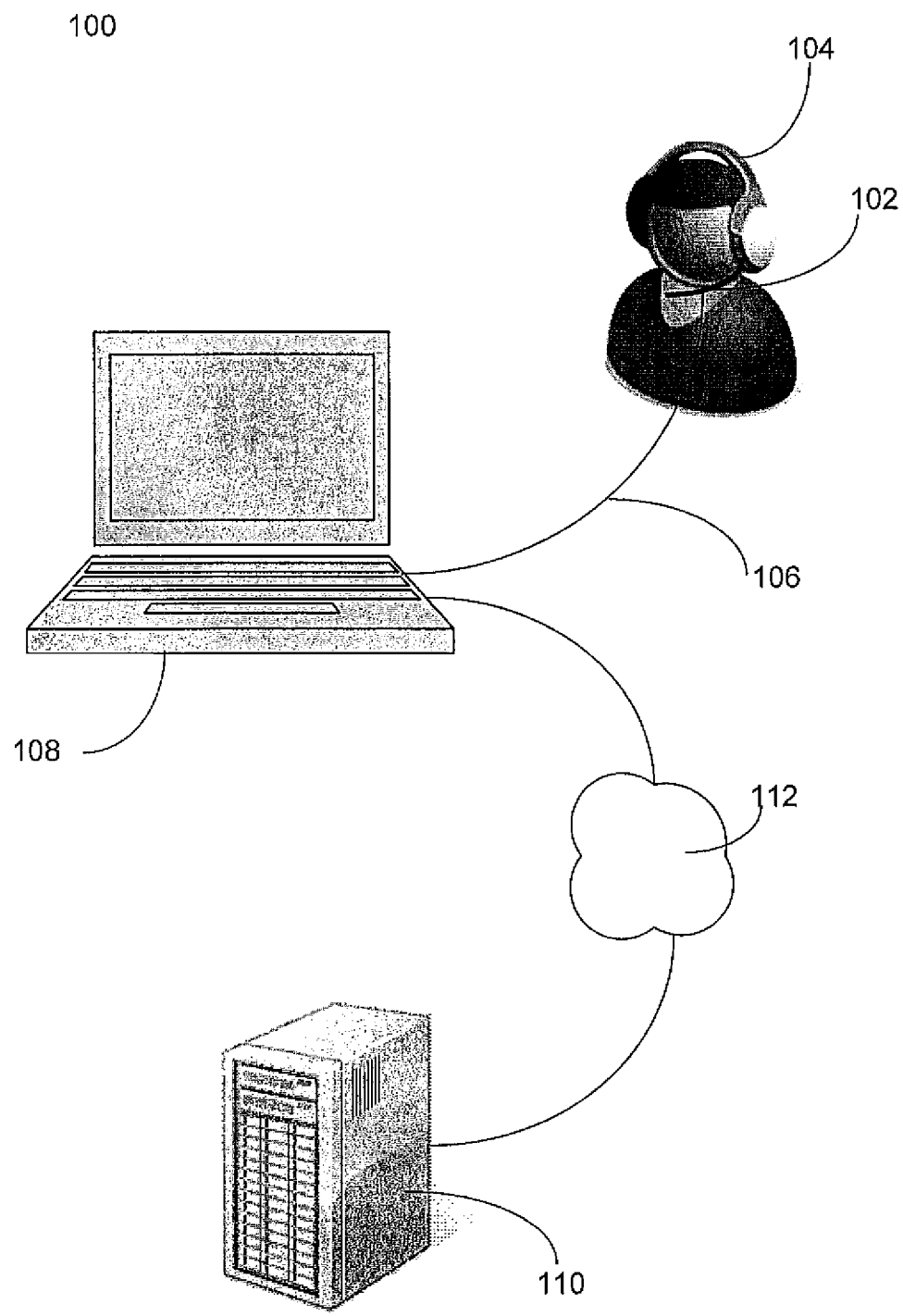
FIG. 1 is a functional block diagram of an exemplary system consistent with the technology of the present application.
Figure 2:
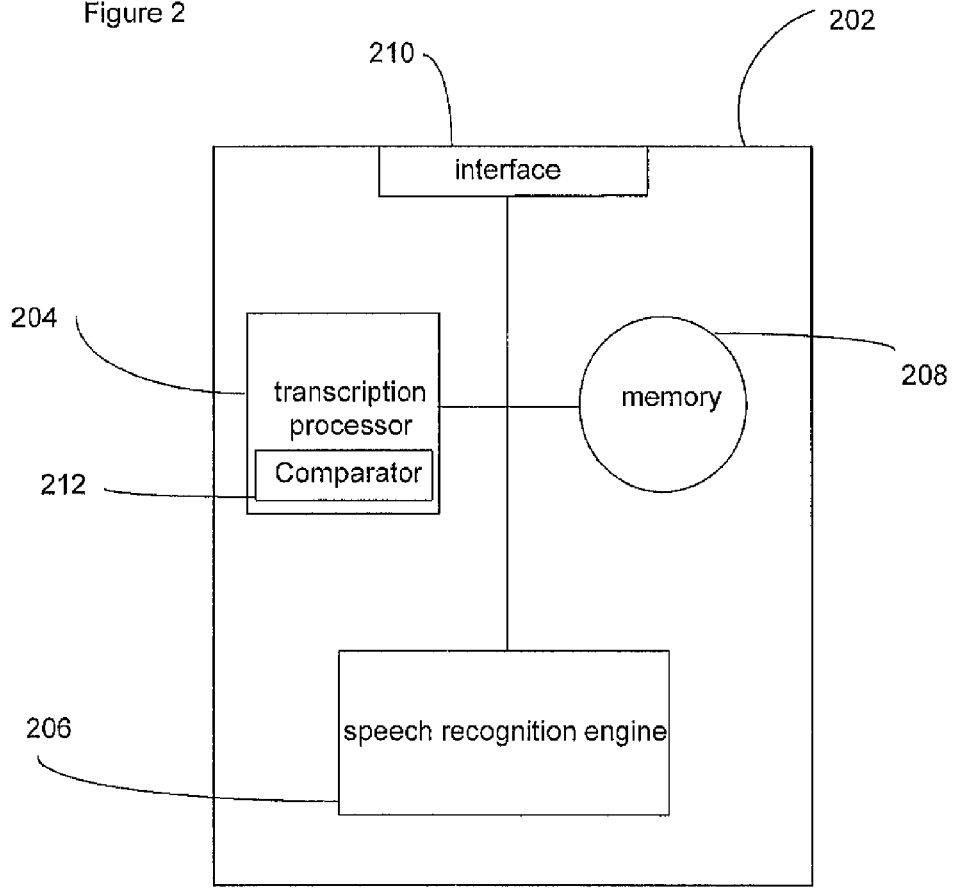
FIG. 2 is a functional block diagram of an exemplary module consistent with the technology of the present application.

Referring first to FIG. 1, a dictation system 100 is provided. Dictation system 100 includes a microphone 102, which may be part of a headset 104 as shown, or a more conventional stand alone microphone. Microphone 102 is coupled via a communication link 106 to a client station 108, such as a laptop computer, a desktop computer, a portable digital assistant, a smart phone, a cellular telephone, or the like. Optionally, microphone 102 may contain a processor to pre-process the audio into a format compatible with processor 108. Communication link 106 may be any conventional communication link such as a universal serial bus, a Bluetooth connection, or the like. Processor 108 may be connected to a remote server 110 via a network 112, such as, for example, a LAN, a WAN, a WLAN, a WIFI, a WMax, the Internet, an Ethernet, or the like. As shown in FIG. 2, client station 108, remote server 110, both, or a combination thereof, would contain all or parts of a transcription module 202. The transcription module 202 is identified as a trainable transcription module because it can be trained to recognize code phrases or quick notes that are equated with particular transcription textual data as will be explained in more detail below. Transcription module 202 interconnects a transcription processor 204, speech recognition engine 206, a memory 208, and an interface 210. Interface 210 receives audio files, commands, and data from client station 108 or remote server 110 and transmits converted textual data to client station 108 or remote server 110, or the like. Transcription processor 204 may be co-located with the central processing unit, microprocessor, field programmable gate array, logic circuits, chip-sets, or the like, of either client station 108 or remote server 110. Transcription processor 204 controls the major functions of the transcription module 202 to allow it to function as further explained below. Transcription processor 204 also processes various inputs and/or data that may be required to operate the transcription module 202. The memory 208 may be remotely located or co-located with transcription processor 204. The memory 208 stores processing instructions to be executed by transcription processor 204. The memory 208 also may store data necessary or convenient for operation of the dictation system. For example, memory 208 may store code phrases or quick notes and the equated particular transcription textual data as will be explained further below. Memory 208 also may store the audio file being transcribed as well as the transcribed textual data at least until the textual data file is transmitted from the trainable transcription module. Speech recognition engine 206 converts the utterances contained in the audio file to textual data, such as a word document, or the like. Speech recognition engine 206 may operate similar to a number of available speech recognition systems including, WINDOWS® Speech, which is available from Microsoft, Inc., Lumen Vox SRE, Nuance 9 Recognizer, which is available from Nuance, Inc., Dragon® NaturallySpeaking®, which is available from Nuance, Inc., among other available systems. As shown, transcription processor 204 contains a comparator 212, although comparator 212 may be located remotely or separately from transcription processor 204. Comparator 212 would compare clauses in converted textual data with code phrases or quick notes stored in memory 208. If clauses in the converted textual data match a code phrase or quick note, transcription processor 204 would replace the converted textual data clause with particular transcription textual data equated with the code phrase or quick note (as can be appreciated code phrase and quick note are used interchangeably herein).

Figure 3:
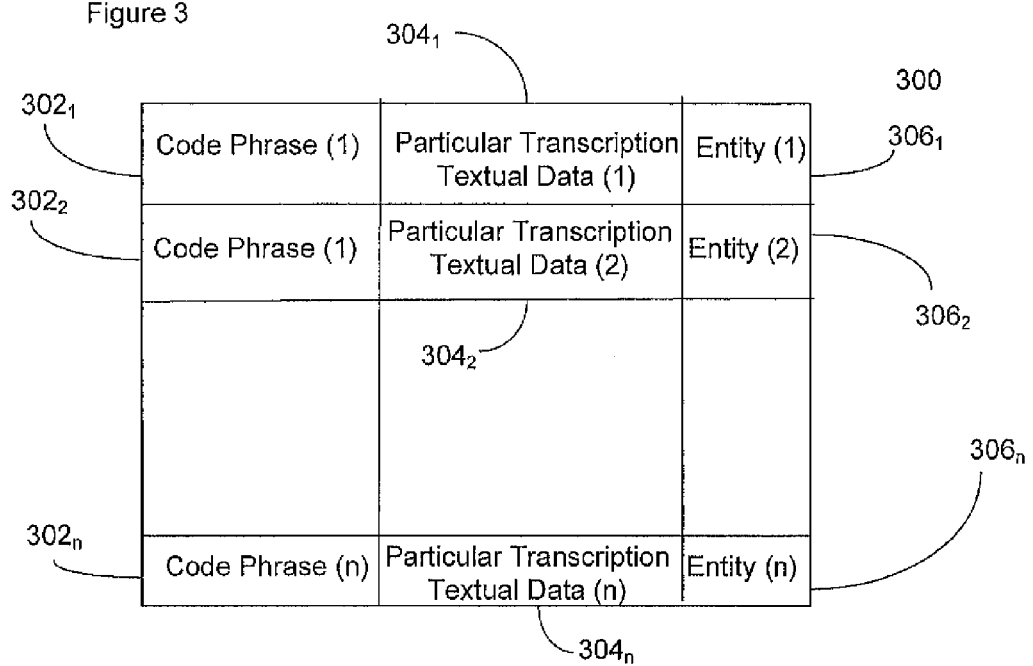
FIG. 3 is a diagram of an exemplary database consistent with the technology of the present application.

As mentioned, transcription module 202 stores code phrases in memory 208. The code phrases are equated with particular transcription textual data. Referring to FIG. 3, a database 300 showing an exemplary memory database is provided. Database 300 has a plurality of code phrase fields $302_{1-n}$, a plurality of particular transcription textual data fields $304_{1-n}$ where each code phrase is associated with a corresponding particular transcription textual data. Database 300 also has a plurality of hierarchical fields $306_{1-n}$. A hierarchical field 306 is associated with each code phrase field 302 and particular transcription textual data field 304. Database 300 may be entered directly from trainable transcription module 202, downloaded from client station 108 or remote server 110 as a matter of design choice. Also, as mentioned above, many organizations have an organizational structure. The present database shows in entity field 306 what entity established the code phrases. As shown in database 300, code phrase (1) may be associated with two different particular transcription textual data (1), (2) established by different entities (1), (2). In this case, transcription processor 204 would select the appropriate particular transcription textual data depending on the user that created the audio file. For example, code phrase (1) may be associated with a divisional entity (1) that establishes particular transcription textual data (1), In this case, an entity above or below the divisional entity on the organization chart may elect to have a different particular transcription textual data (2) associated with code phrase (1). Thus, when entity (2) uses the code phrase (1) in the audio file, the trainable transcription module 202 would select particular transcription textual data (2) instead of particular transcription textual data (1) and when entity (1) uses the code phrase (1) in the audio file, the trainable transcription module 202 would select particular transcription textual data (1) instead of particular transcription textual data (2). Notice, the entity entry may designate whether edits or changes by higher, lower, or peer entities in the hierarchical structure can edit the particular transcription textual data.

Figure 4:
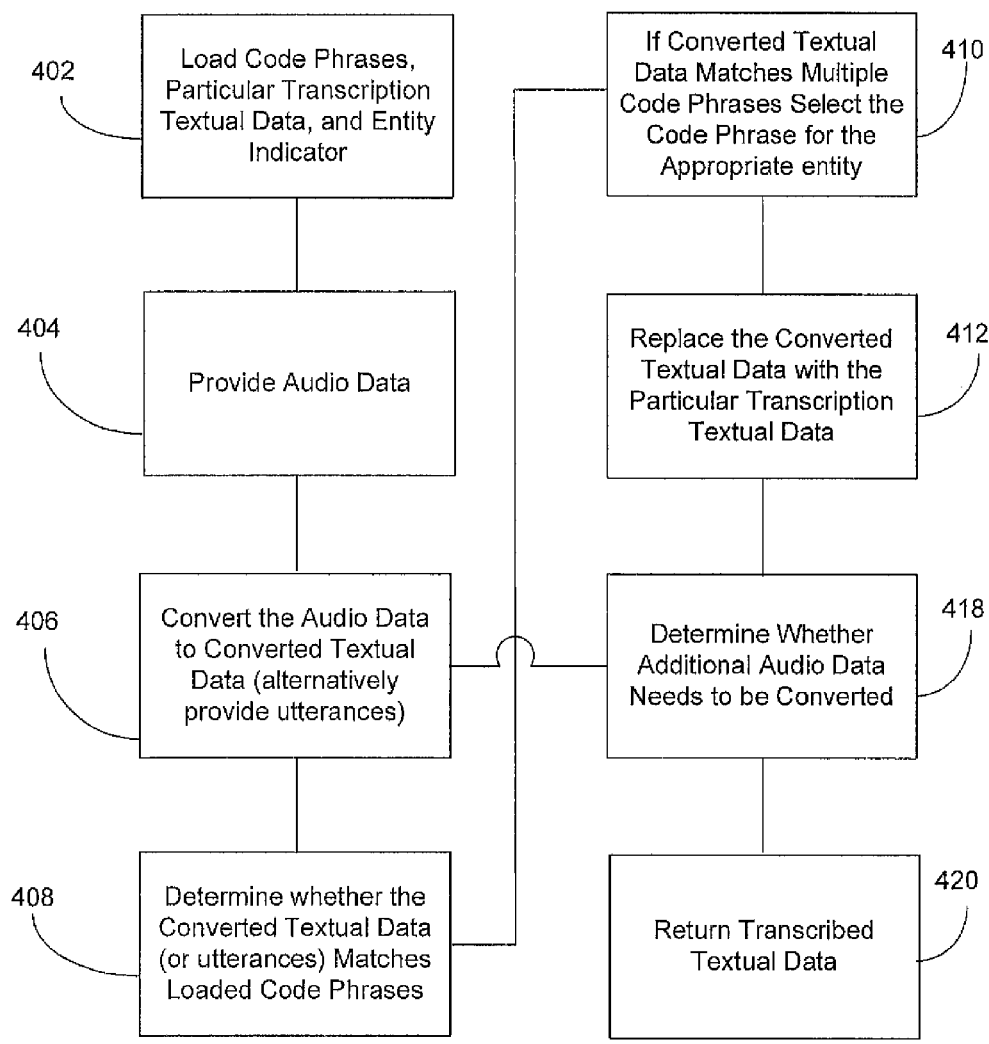
FIG. 4 is a functional block diagram illustrative of a methodology consistent with the technology of the present application.

Referring now to FIG. 4, a flow chart 400 is provided illustrative of a methodology of using the technology of the present application. While described in a series of discrete steps, one of ordinary skill in the art would recognize on reading the disclosure that the steps provided may be performed in the described order as discrete steps, a series of continuous steps, substantially simultaneously, simultaneously, in a different order, or the like. Moreover, other, more, less, or different steps may be performed to use the technology of the present application, In the exemplary methodology, however, code phrases, particular transcription textual data, and the appropriate entity indicator are loaded into memory 208, step 402. Next, audio data is provided to the transcription module 202, step 404. The speech recognition engine 206 would convert the audio data (whether streamed or batch loaded) to converted textual data, step 406. For example, the audio data may be converted to a word document or the like.

The converted textual data is compared to the code phrases stored in memory to determine whether the words, clauses, phrases, etc. in the converted textual data match one or more code phrases, step 408. Determining whether the connected textual data matches one or more code phrases may include determining that the confidence of the converted textual data is above, for example, 90%. The comparison may be performed substantially as the audio is converted to converted textual data or subsequently after the entire audio file is converted. If more than one code phrase is matched, the transcription module selects the code phrase having the appropriately matched entity indicator, step 410. The converted textual data is replaced with particular transcription textual data, step 412. The process continues until it is determined that the entire audio file has been transcribed, step 414, and all the code phrases or quick notes have been matched and updated. The transcription module returns the transcribed textual data, step 416, by streaming the data to client station 108 or remote processor 110, batch loading the data to client station 108 or remote processor 110, or a combination thereof. Notice, instead of using converted textual data in the comparison, the process may use utterances and match certain utterances to particular transcription textual data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of using pre-established code phrases to cause a standard clause to be transcribed into a textual file comprising the steps performed on at least one processor of:

receiving an audio signal from a user who is a member of an organization that is to be converted to a textual file by a speech to text engine;

obtaining a plurality of code phrases from at least a first entity and a second entity of the organization, wherein each of the plurality of code phrases is linked to at least one standard clause and at least one of or both of the first entity and the second entity and wherein the at least one standard clause is different for the first entity and the second entity when the at least one code phrase is linked to both of the first entity and the second entity, wherein each of the plurality of code phrases is established as (1) non-modifiable by entities lower in a hierarchical arrangement of the entities of the organization or (2) as non-modifiable by entities higher in the hierarchical arrangement, and wherein an entity entry designates whether changes to a particular one of the at least one standard clause are permitted by higher, lower, or peer entities in the hierarchical arrangement;

converting the audio signal to a data signal corresponding to textual data representative of the audio file;

comparing the data signal to the plurality of code phrases stored in a memory that is linked to at least one standard clause that is to be transcribed into a textual file;

determining whether the data signal matches the at least one code phrase stored in the memory and whether the user is a member of the first entity or the second entity; and if it is determined that the data signal matches the at least one code phrase and the user is a member of the first entity, replacing the data signal with the standard clause linked to the at least one code phrase and the first entity wherein the standard clause is reproduced in the textual file, and if it is determined that the data signal matches the at least one code phrase and the user is a member of the second entity, replacing the data signal with the standard clause linked to the at least one code phrase and the second entity wherein the standard clause is reproduced in the textual file; and if it is determined that the data signal does not match the at least one code phrase or the user is not a member of the first or second entity, the data signal is reproduced in the textual file, wherein the textual file is created such that the at least one code phrase is replaced by the standard clause, and wherein the user is permitted to change the code phrase and the standard clause if the user is a member of an entity permitted to modify the code phrases and permitted to change the standard clauses.

2. The method of claim 1 further comprising the step of loading the at least one code phrase and linking the at least one code phrase to the standard clause into the memory.

3. The method of claim 2 wherein the step of loading the at least one code phrase includes providing an identifier with the at least one code phrase.

4. The method of claim 3 further comprising the step of determining whether the data signal matches that at least one code phrase comprises selecting the appropriate standard clause based on the identifier.

5. The method of claim 1 wherein the code phrase is replaced by the standard clause in the data signal.

6. The method of claim 1 further comprising the step of generating a confidence level of recognition of the code phrase and the determining step only occurs when the confidence level exceeds a predetermined threshold.

7. The method of claim 6 wherein the confidence level threshold is at least 90%.

8. An apparatus comprising,
a trainable transcription module trainable to recognize code phrases that are equated with particular transcription textual data and an entity identifier wherein the entity identifier comprises at least a first entity and a second entity, the trainable transcription module comprising:
a speech recognition engine to convert utterances in an audio file into a textual data file;
a comparator to determine whether any utterances match at least one code phrase, wherein the comparator operates on the utterances contained in the audio file prior to the conversion of audio file into textual data;
a memory to store the at least one code phrase and link the at least one code phrase to the particular transcription textual data and the at least one entity identifier; and
a processor that replaces the utterances with the particular transcription textual data when it is determined that the utterance matches the at least one code phrase and the audio file originated from a user associated with an entity that is equated with the at least one code phrase, wherein the textual data file is returned subsequent to the processor replacing the matched utterances with the particular transcription data, wherein the first entity and the second entity are organized in a hierarchical arrangement of entities belonging to an organization, wherein each of the code phrases is established as (1) non-modifiable by entities lower in the hierarchical arrangement or (2) as non-modifiable by entities higher in the hierarchical arrangement, wherein an entity entry designates whether changes to the particular transcription textual data are permitted by higher, lower, or peer entities in the hierarchical arrangement, and wherein a user who is associated with the first entity or the second entity is permitted to change the code phrase and the particular transcription textual data if the entity with which the user is associated is an entity that is permitted to modify the code phrases and permitted to change the particular transcription textual data.

9. The apparatus of claim 8 wherein the processor replaces the matched at least one code phrase with the at least one standard textual clause by replacing the textual data output from the speech recognition engine with the at least one standard textual clause.

10. The apparatus of claim 8 wherein the processor replaces the matched at least one code phrase with the at least one standard textual clause by overwriting the textual data output from the speech recognition engine with the at least one standard textual clause.

11. The apparatus of claim 8 wherein the processor determines a confidence of the recognized at least one code phrase and only replaces the recognized at least one code phrase if the confidence exceeds a predefined threshold.

12. The method of claim 1 further comprises storing at least one user defined code phrase that is linked to a user defined standard clause and wherein the determining step further determines whether the data signal matches the user defined code phrase stored in the memory and wherein if it is determined that the data signal matches the at least one user defined code phrase, replacing the data signal with the standard clause wherein the standard clause is reproduced in the textual file.

13. The method of claim 1 wherein the at least one standard clause is unchangeable by the user.

* * * * *

UNITED STATES PATENT AND TRADEMARK OFFICE
CERTIFICATE OF CORRECTION

| | | |
|---|---|---|
| PATENT NO. | : 8,831,940 B2 | Page 1 of 1 |
| APPLICATION NO. | : 13/052900 | |
| DATED | : September 9, 2014 | |
| INVENTOR(S) | : Corfield et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 482 days.

Signed and Sealed this
Eighteenth Day of August, 2015

Michelle K. Lee
*Director of the United States Patent and Trademark Office*